United States Patent [19]

Rasmussen

[11] Patent Number: 4,780,204

[45] Date of Patent: Oct. 25, 1988

[54] FLUID COLLECTOR WITH UPRAISED RIDGES

[75] Inventor: Harold O. Rasmussen, Bonita, Calif.

[73] Assignee: Harvard Corporation, Evansville, Wis.

[21] Appl. No.: 60,102

[22] Filed: Jun. 9, 1987

[51] Int. Cl.⁴ .................. B01D 25/02; B01D 29/48
[52] U.S. Cl. ..................... 210/314; 210/435; 210/488; 210/497.1; 55/492; 55/498
[58] Field of Search ............ 210/314, 346, 486, 488, 210/494.1, 497.1; 55/484, 492, 498, 520

[56] References Cited

U.S. PATENT DOCUMENTS

| | | | |
|---|---|---|---|
| 3,048,276 | 8/1962 | Darnell | 210/488 |
| 3,079,001 | 2/1963 | May | 210/488 |
| 4,017,400 | 4/1977 | Schade | 210/494.1 |
| 4,579,657 | 4/1986 | Hood, Jr. | 210/314 |
| 4,668,393 | 5/1987 | Stone | 210/497.1 |
| 4,690,761 | 9/1987 | Orlans | 210/488 |

FOREIGN PATENT DOCUMENTS 1032086 5/1978 Canada.

OTHER PUBLICATIONS

Hydra-Supreme System, Hydra-Tech Hydraulics Inc., 11165 Condor Avenue, Fountain Valley, Calif., 92708, #00-181.

Primary Examiner—Richard V. Fisher
Assistant Examiner—Wanda L. Millard
Attorney, Agent, or Firm—Lathrop & Clark

[57] ABSTRACT

A fluid collector for use in a fluid filter includes a substantially flat portion having two sides of which at least one faces a filter element from which filtered fluid is received, a centrally disposed opening adapted to allow the centrally located flow path to pass axially therethrough, and at least one slot which forms a passageway for filter fluid to flow from the filter elements to the receiving ports into the centrally located flow path. The fluid collector also includes ridges which project axially from at least one side of the substantially flat portion to maintain the filter element ends in parallel spaced relationship to the substantially flat portion. The filter collector further includes a continuous annular ring portion which projects axially from the outer perimeter of the flat portion on at least one side thereof to extend into each adjacent filter element exit end between those layers of filter element tissue which are located inwardly a few layers from the periphery of each filter element, so that a seal is formed which separates filtered fluid from unfiltered fluid.

14 Claims, 2 Drawing Sheets

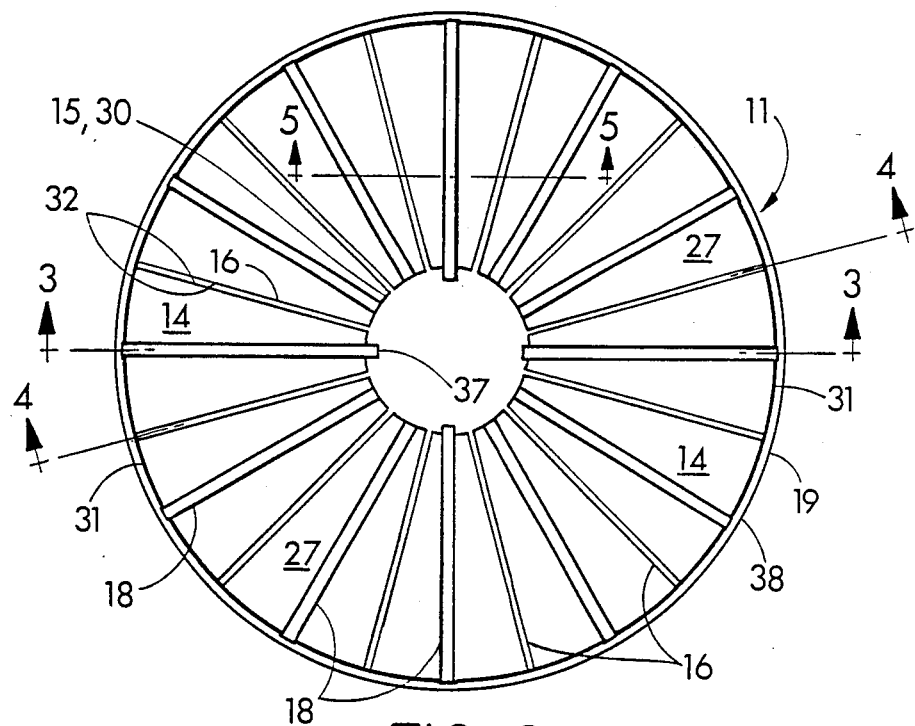
FIG. 2
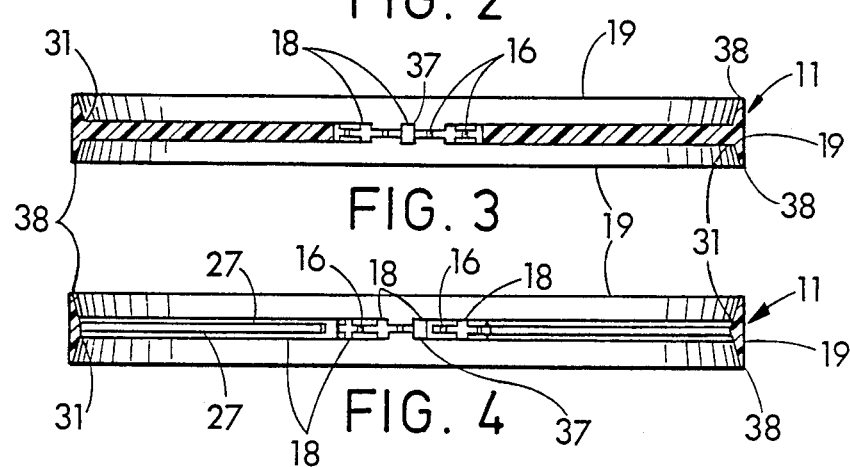
FIG. 3
FIG. 4
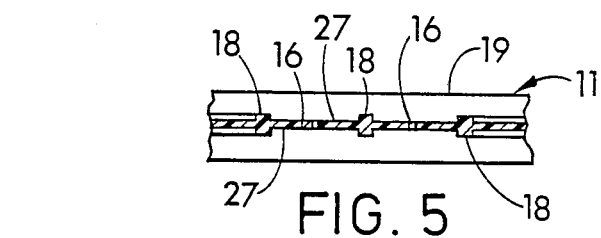
FIG. 5

FLUID COLLECTOR WITH UPRAISED RIDGES

BACKGROUND OF THE INVENTION

1. Field

The present invention relates to filters for fluids such as hydraulic oil, transformer oil and lubricating oil, and more particularly to a fluid collector for use therewith.

2. Description of the Prior Art

Fluid filters for removing dirt, common residue, abrasive particles, acid condensate, sludge and corrosive matter from fluids such as engine lubricating oil are well known in the art. These filters are usually packaged either as disposable canisters, replaceable cartridges, or as containers for containing generally one or more filter elements which are formed with wound layers of tissue. Inflow and outflow connections are provided at the container inlet and outlet ports. Fluid entering the container will flow freely to an end of each filter element where it enters the filter element. The fluid then flows axially through each filter element in the interstices between the layers of filter tissue so that the dirt and sludge is removed from the fluid by the tissue layers. When the filter contains only one filter element, the fluid flows from one end of the container to the other, through one end of the filter element, then out the other end of the filter element. The fluid then is directed by a fluid collector to a centrally located flow path which is connected to the outlet port.

When two filter elements are used, the fluid flows from both ends of the container through the filter elements to a collector located between the filer elements. The collector has a passageway which directs the fluid to the centrally located flow path, where it is directed out the outlet port. When four filter elements are used in the filter container, the filter acts in a similar manner as would two filters having dual filter elements. The filter elements are organized into two pairs of opposed filter elements so that the fluid flows from both ends of each pair through the filter elements to the collector which is located between the two opposed filter elements of each pair. Therefore, a container having four filter elements typically has two fluid collectors.

The pressure drop across the entire filter may be from fifteen pounds per square inch (P.S.I.) to ninety P.S.I. or more, resulting in substantial compressive forces being exerted hydraulically on the tissue layers. These forces tend to compress and distort the filter elements, particularly at the end of each filter element where filtered fluid exits. Fluid collectors have been utilized to receive the filtered fluid from the filter elements and to transport that fluid through one or more passageways in the collector to the centrally located flow path. As disclosed in U.S. Pat. No. 4,017,400 to Schade, these collectors generally have an annular portion which extends into the adjacent filter element ends to form a seal which separates the filtered from unfiltered fluid. Usually a screen is disposed between the collector and filter element to hold the filter element end in spaced relation to the collector so that filtered fluid is free to flow from the filter element end into the collector.

It has been found that the pressure forces which tend to compress and distort theffilter elements also tend to force the layers of tissue of the filter element to be pressed down into the holes in the screen, thereby decreasing the flow of filtered fluid into the collector. This is particularly a problem in industrial applications where relatively high flowages through the filter elements are required.

SUMMARY OF THE INVENTION

The present invention is summarized in that a fluid collector, for use in a pressurized axial flow fluid filter with at least one filter element which is formed with wound layers of tissue and which encircles a centrally located flow path to a filter container outlet port, includes a substantially flat portion having two sides of which at least one side faces a filter element end from which filtered fluid is received, an inner margin which defines a centrally disposed opening adapted to allow the centrally located flow path to pass axially therethrough, an outer perimeter, and at least one pair of edges which extend from the outer perimeter to the inner margin, each pair of edges defining a slot which forms a passageway for filter fluid to flow from the filter elements to the receiving ports into the centrally located flow path. The fluid collector further includes at least three ridges which project axially from each side of the substantially flat portion which is adapted to face a filter element, the ridges being adapted to maintain each filter element end in parallel spaced relation to the substantially flat portion of the collector. Additionally, the fluid collector includes a continuous annular ring portion which projects axially from the outer perimeter of the flat portion on each side which is adapted to face a filter element end, the annular ring portion extending into each adjacent filter element end between those layers of filter element tissue which are located inwardly a few layers from a periphery of each filter element, so that a seal is formed with each adjacent filter element end, the seal separating the filtered fluid from the unfiltered fluid.

A primary object of the invention is to provide a fluid collector which allows increased flows of filtered fluid from the filter elements into the collector and hence into the centrally located flow path and out the container outlet port.

A second object of the invention is to provide a fluid collector having ridges which maintain the filter element ends in parallel spaced relation to the substantially flat portions of the collector so that filtered fluid may exit the filter elements into the space between the substantially flat portion of the collector and the filter element end.

Another object of the invention is to provide a fluid collector which allows filtered fluid to pass from the filter elements into the collector passageways with essentially no impediment to flow between the filter elements and collector passageways.

An additional object of the invention is to provide an improved fluid collector which may be easily and inexpensively manufactured in large quantities.

Other objects, features, and advantages of the invention will be apparent from the following detailed description taken in conjunction with the accompanying drawings wherein a preferred embodiment of the invention has been selected for exemplification.

BRIEF DESCRIPTION OF THE DRAWINGS

FIG. 2 is a top plan view of a fluid collector according to the present invention.

FIG. 3 is a cross-section view taken along section line 3—3 of FIG. 2.

FIG. 4 is a cross-section view taken along section line 4—4 of FIG. 2.

FIG. 5 is a cross-section view taken along section line 5—5 of FIG. 2.

DESCRIPTION OF THE PREFERRED EMBODIMENT

Figure 1:
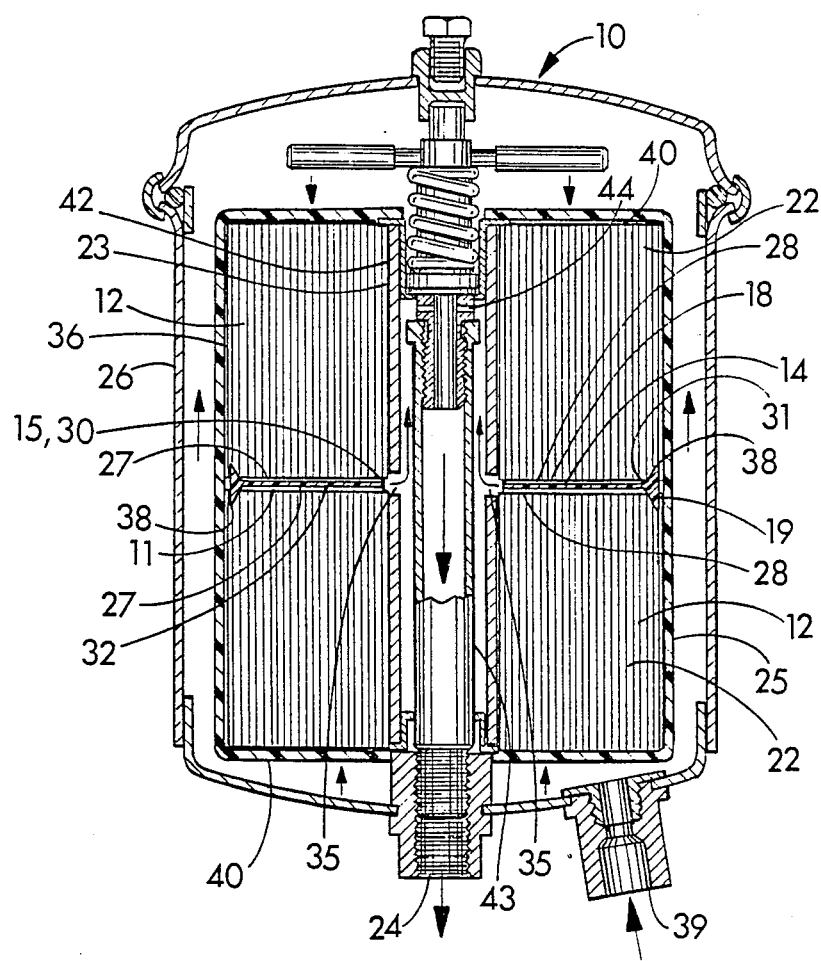
FIG. 1 is a cross-section view of a pressurized axial flow fluid filter having two opposed filter elements, showing the fluid collector of our present invention in section view between the filter elements.

Referring more particularly to the drawings, wherein like numbers refer to like parts, FIG. 1 shows a pressurized axial flow fluid filter 10 utilizing a preferred fluid collector 11 of the present invention disposed between two opposed filter elements 12. FIG. 2 shows the fluid collector 11 alone in top plan view. As shown in FIG. 2, the fluid collector 11 includes a substantially flat portion 14, a centrally disposed opening 15, twelve slots 16, twelve upraised ridges 18, and a continuous annular ring portion 19. The collector 11 is utilized in pressurized axial flow fluid filters 10 such as is shown in FIG. 1. Such a filter 10 includes at least one filter element 12 which is formed from wound layers of tissue 22 and encircles a centrally located flow path 23 which leads to the outlet port 24 of the container 26. The filter elements 12 are often surrounded by a sock 25 as shown in FIG. 1.

The substantially flat portion 14 of the preferred fluid collector 11 has two sides 27, both of which are adapted to face a filrer element exit end 28 from which filtered fluid flows. The substantially flat portion 14 furter includes an inner margin 30 which defines the centrally disposed opening 15 through which the centrally located flow path 23 passes axially. The flat portion 14 also includes an outer perimeter 31 and twelve pairs of edges 32 which extend from the outer perimeter 31 to the inner margin 30 thereby defining twelve slots 16, each of which forms a passageway for filtered fluid to flow from the filter elements to receiving ports 35 into the centrally located flow path 23. The slots 16 perform a further function in that they allow the pressure on both sides 27 of the flat portion 14 to be equalized. In the preferred fluid collector 11 shown in FIG. 2, the two edges 32 of each pair of edges 32 defining a slot 16 are parallel to each other, and substantially radial so that each slot 16 is radial in orientation.

The preferred fluid collector 11 further includes twelve upraised ridges 18 which project axially from each side 27 of the collector flat portion 14, since both sides 27 are adapted to face a filter element end 28. These twelve ridges 18 maintain the adjacent filter element ends 28 in a parallel spaced relatiOn to the collector flat portion 14 so that the filtered fluid is free to flow from the filter elements 12 into the collector 11. Placement of the substantially flat portion 14 directly against the filter element ends 28 would block much of the filtered fluid flow into the passageways within the collector 11. The space created by the parallel spaced relation between the filter element ends 28 and flat portion 14 also may form passageways for filtered fluid to flow to the receiving ports 35 into the centrally located flow path 23. Preferably, four of the ridges 18 on each side 27 of the substantially flat portion 14, which are spaced 90 degrees apart, extend radially inwardly slightly beyond the inner margin 30 into the centrally disposed opening 15 in the preferred fluid collector 11 as shown at 37 in FIG. 2. These inward extensions 37 serve to space the inner margin 30 from the flow path 23 to permit the flow of fluid therebetween. The twelve ridges 18 and twelve slots 16 are all radial in orientation, alternating with each other so that each slot 16 is located equidistantly between the two adjacent ridges 18, as shown in FIGS. 2-5.

The continuous annular ring portion 14 projects axially from the outer perimeter 31 of the flat portion 14 on each side 27 thereof since both sides of the preferred collector 11 are adapted to face a filter element end 28. The annular ring portion 19 is adapted to extend into each adjacent filter element exit end 28 between those layers of filter element tissue 22 which are located inwardly a few tissue layers 22 from a periphery 36 of each filter element 12 so that a seal is formed with both adjacent filter element ends 28 as shown in FIG. 1. This seal separates the filtered fluid in the collector from unfiltered fluid. As shown in FIGS. 3 and 4, the annular ring portion 19 is tapered to a sharp edge 38 where the annular ring portion 19 is adapted ro extend into a filter element end 28. Since the preferred fluid collector 11 is adapted to extend into the ends 28 of two filter elements 12, the annular ring portion 19 has two sharp edges 38, one to each side 27 of the substantially flat portion 14. Each sharp edge 38 allows the fluid collector 11 to be pushed more easily between the layers of filter tissue 22 of adjacent filter element ends 28 without damaging the tissue 22.

In its operation, the fluid collector 11 is intended for use in a pressurized axial flow fluid filter 10 as shown in FIG. 1. A fluid such as engine lubricating oil flows into the filter container 26 through the inlet port 39. The unfiltered fluid then flows in about equal proportion to an intake end 40 of each of the filter elements 12. The unfiltered fluid is filtered as it moves axially between the wound layers of tissue 22 in the filter elements 12. Eventually filtered fluid exits from the exit end 28 of each filter element where it enters the passageways in the fluid collector 11 formed by the upright ridges 18, the substantially flat portion 14, and the slots 16. The filter fluid flows through these passageways to the receiving ports 35 into the centrally located flow path 23. In the preferred fluid filter 10, the centrally located flow path 23 is formed from a registering tube 42 and an exit tube 43 which is located inside the registering tube 42. Filtered oil enters the registering tube 42 rhrough the receiving ports 35, and then flows along the outside of the exit tube 43 until it enters the exit tube 43 through the holes 44. The filtered fluid then travels downwardly through the exit tube 43 and out the outlet port 24.

This fluid collector 11 may be manufactured easily and inexpensively, preferably being molded from plastic, yet it allows fluid to flow more rapidly through the filter and therefore to be filtered more efficiently. No screens are required to create a space into which filtered fluid may flow. The increased fluid flow resulting from the absence of these screens is particularly important in industrial applications where large quantities of lubricating fluid may be required, such as in grinding operations.

It is to be understood that the present invention is not limited to the particular arrangement and embodiments of parts disclosed and illustrated herein, nor to the materials specified, but embraces all such modified forms thereof as come within the scope of the following claims.

I claim:

1. A fluid collector for use in a pressurized axial flow fluid filter with at least one filter element which is formed with wound layers of tissue and which encircles a centrally located flow path to a filter container outlet port, the fluid collector comprising:
  (a) a substantially flat portion having (i) two sides, at least one of which is adapted to face a filter element end from which filtered fluid is received; (ii) an inner margin which defines a centrally disposed opening adapted to allow the centrally located flow parh to pass axially therethrough; (iii) an outer perimeter; and (iv) at least one pair of edges which extend from the outer perimeter to the inner margin, each pair of edges defining a slot which forms a passageway for filtered fluid to flow from the filter elements to receiving ports into the centrally located flow path, and also allowing fluid pressure to be equalized on both sides of the substantially flat portion;
  (b) at least three ridges which project axially from each side of the substantially flat portion which is adapted to face a filter element end, the ridges maintaining the filter element end in parallel spaced relation to the substantially flat portion; and
  (c) a continuous annular ring portion which projects axially from the outer perimeter of the flat portion on each side which is adapted to face a filter element exit end, the annular ring portion being adapted to extend into each adjacent filter element end between those layers of filter element tissue which are located inwardly a few tissue layers from a periphery of each filter element, so that a seal is formed with each adjacent filter element end, the seal separating filtered fluid in the collector from unfiltered fluid.

2. The fluid collector specified in claim 1 wherein the ridges and the annular ring portion project axially from each side of the substantially flat portion.

3. The fluid collector specified in claim 1 wherein the annular ring portion is tapered to a sharp edge where it is adapted to extend into a filter element end, so that the annular ring portion can be pushed easily between layers of filter tissue of adjacent filter element ends.

4. The fluid collector specified in claim 1 wherein the two edges defining each slot are parallel to each other and substantially radially extending so that each slot is radial in orientation.

5. The fluid collector specified in claim 1 wherein the ridges are radial in orientation, extending from the outer perimeter inwardly to at least the inner margin.

6. The fluid collector specified in claim 5 wherein four of the ridges, which are spaced approximately equidistantly from each other, extend radially inwardly slightly beyond the inner margin into the centrally disposed opening.

7. The fluid collector specified in claim 1 wherein there are twelve ridges which are radial in orientation, and twelve pairs of edges defining twelve slots which also are radial in orientation, each sot being located approximately equidistantly between the two adjacent ridges.

8. A pressurized axial flow fluid filter comprising:
  (a) a cotainer with an inlet port and an outlet port;
  (b) a centrally located flow path having at least one receiving port for receiving filtered fluid which is to be transported out the container outlet port;
  (c) at least one filter element formed with wound layers of tissue and which encircles the centrally located flow path to the outlet port;
  (d) at least one fluid collector, each collector encircling the centrally located flow path adjacent the receiving ports, the fluid collector including (i) a substantially flat portion having two sides of which at least one faces a filter element exit end from which filtered fluid is received, an inner margin which defines a centrally disposed opening through which the centrally located flow path axially passes, an outer perimeter, and at least one pair of edges which extends from the outer perimeter to the inner margin, each pair of edges defining a slot which forms a passageway for filtered fluid to flow from the filter elements to the receiving ports into the centrally located flow path and also allowing fluid pressure to be equalized on both sides of the substantially flat portion; (ii) at least three ridges which project axially from each side of the substantially flat portion which faces a filter element exit end, the ridges maintaining the filter element end in parallel spaced relation to the substantially flat portion; and (iii) a continuous annular ring portion which projects axially from the outer perimeter of the flat portion on each side which faces a filter element exit end, the annular ring portion extending into each adjacent filter element end between those layers of filter element tissue which are located inwardly a few layers from a periphery of each filter element, so that a seal is formed with each adjacent filter element end, the seal separating the filtered fluid from unfiltered fluid.

9. The pressurized axial flow fluid filter specified in claim 8 wherein each fluid collector is located between two opposed filter elements and both sides of each collector flat portion face a filter element exit end from which filtered fluid is received.

10. The pressurized axial flow fluid filter specified in claim 8 wherein the annular ring portion of each fluid collector is tapered to a sharp edge where it extends into a filter element end, so that the annular ring portion is pushed easily between the layers of filter tissue of adjacent filter element exit ends with minimal deformation of tissue.

11. The pressurized axial flow fluid filter specified in claim 8 wherein the two edges defining each slot in each collector are parallel to each other, and substantially radially extending.

12. The pressurized axial flow fluid filter specified in claim 8 wherein the ridges on each collector are radial in orientation, extending from the outer perimeter inwardly to at least the inner margin.

13. The pressurized axial flow fluid filter specified in claim 12 wherein four of the ridges, which are spaced approximately equidistantly from each other, extend radially inwardly slightly beyond the inner margin into the centrally disposed opening.

14. The pressurized axial flow fluid filter specified in claim 8 wherein the fluid collector has twelve ridges which are radial in orientation, and twelve pairs of edges defining twelve slots which also are radial in orientation, each slot being located equidistantly between the two adjacent ridges.

* * * * *